United States Patent
Mead et al.

(10) Patent No.: US 8,211,530 B2
(45) Date of Patent: Jul. 3, 2012

(54) ADHESIVE FILLETS AND METHOD AND APPARATUS FOR MAKING SAME

(75) Inventors: William T. Mead, Long Beach, CA (US); John Potter, Camarillo, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1261 days.

(21) Appl. No.: 10/357,162

(22) Filed: Feb. 3, 2003

(65) Prior Publication Data

US 2004/0151878 A1  Aug. 5, 2004

(51) Int. Cl.
*B32B 1/00* (2006.01)
*B32B 3/00* (2006.01)

(52) U.S. Cl. ........................................ 428/174; 428/156
(58) Field of Classification Search .................. 428/174, 428/178, 188, 156; 156/222; 244/123, 124, 244/131, 126, 120, 125; 404/374.1, 404, 404/409.1
See application file for complete search history.

(56) References Cited

U.S. PATENT DOCUMENTS

| | | | |
|---|---|---|---|
| 2,951,004 A * | 8/1960 | Rambosek et al. ........ 156/306.9 |
| 3,944,457 A | 3/1976 | Podvin et al. | |
| 4,080,136 A | 3/1978 | Peller | |
| 4,113,910 A * | 9/1978 | Loyd ............................ 428/162 |
| 4,188,845 A | 2/1980 | Stukenberg | |
| 4,265,176 A | 5/1981 | Sato | |
| 4,489,630 A | 12/1984 | Okada et al. | |
| 4,559,005 A | 12/1985 | Gants et al. | |
| 4,559,798 A | 12/1985 | Hayashi et al. | |
| 4,744,846 A * | 5/1988 | Pflug et al. ..................... 156/212 |
| 4,770,914 A * | 9/1988 | Torgerson et al. .............. 428/57 |
| 4,778,545 A | 10/1988 | Von Derau et al. | |
| 4,789,594 A * | 12/1988 | Stawski ........................ 428/397 |
| 4,826,561 A | 5/1989 | Carroll | |
| 4,953,430 A | 9/1990 | Hong | |
| 5,217,766 A * | 6/1993 | Flonc et al. .................. 428/34.5 |
| 5,363,728 A | 11/1994 | Elsner et al. | |
| 6,145,423 A | 11/2000 | Boreali et al. | |
| 6,701,990 B1 | 3/2004 | Burley et al. | |
| 6,709,538 B2 | 3/2004 | George et al. | |

* cited by examiner

*Primary Examiner* — Catherine A Simone
(74) *Attorney, Agent, or Firm* — Alan G. Towner, Esq.; Pietragallo Gordon Alfano Bosick & Raspanti, LLP

(57) ABSTRACT

Methods of forming shaped adhesive fillets are disclosed. The adhesive fillets may be made by stacking multiple layers of adhesive sheets, consolidating the stacked layers, cutting strips from the consolidated layers, and forming the strips into adhesive fillets having desired cross sectional shapes. The fillets may be formed by feeding the strips through an apparatus comprising opposing rollers and a catcher, which facilitates release of the adhesive fillets from the rollers. The formed adhesive fillets are useful for applications such as stiffened panels for aircraft.

13 Claims, 4 Drawing Sheets

ADHESIVE FILLETS AND METHOD AND APPARATUS FOR MAKING SAME

FIELD OF THE INVENTION

The present invention relates to adhesive fillets, and more particularly relates to methods and apparatus for making adhesive fillets for structural applications such as aircraft stiffeners.

BACKGROUND INFORMATION

Adhesive fillets are used in applications such as aircraft stiffeners. For example, stiffeners with hat-shaped cross sections are often attached to the interior surface of aircraft skins in order to provide improved mechanical properties. The adhesive fillets are positioned at interior corners where the stiffeners meet the aircraft skin.

Conventionally, such adhesive fillets have been manually formed into rod shapes by hand-rolling an adhesive sheet, followed by consolidation in a mandrel under heat and vacuum. Each adhesive rod takes several minutes to form, and the hand-rolled adhesive rods tend to have inconsistent shapes and quality.

The present invention has been developed in view of the foregoing and to address other deficiencies of the prior art.

SUMMARY OF THE INVENTION

The present invention provides shaped adhesive fillets for applications such as stiffened panels for aircraft. The adhesive fillets are formed by stacking multiple layers of adhesive sheets, consolidating the stacked layers, cutting strips from the consolidated adhesive layers, and forming the cut strips into desired fillet shapes. The formed fillets may be used in stiffened aircraft panels, for example, at the interior corners of hat-shaped stiffening members.

An aspect of the present invention is to provide a method of making an adhesive fillet. The method comprises stacking multiple adhesive layers, and forming the adhesive layers into a fillet shape.

Another aspect of the present invention is to provide a formed adhesive fillet comprising multiple stacked adhesive layers.

A further aspect of the present invention is to provide an apparatus for making adhesive fillets comprising at least one roller structured and configured to form an adhesive strip into an adhesive fillet shape.

Another aspect of the present invention is to provide a stiffened panel including a stiffening member attached to the panel and at least one formed adhesive fillet attached to the panel and the stiffening member, wherein the at least one formed adhesive fillet comprises multiple stacked adhesive layers.

These and other aspects of the present invention will be more apparent from the following description.

DETAILED DESCRIPTION

Figure 1:
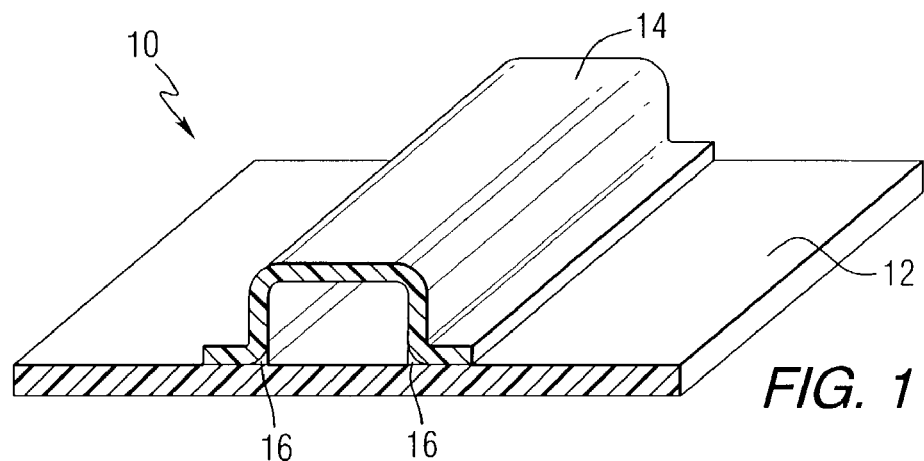
FIG. 1 is an isometric sectional view of a stiffened panel including adhesive fillets in accordance with an embodiment of the present invention.

FIG. 1 illustrates a stiffened structure 10 including a panel 12 and a stiffening member 14. The panel 12 may be made of any suitable material such as metals or composites. For example, the panel may comprise a graphite/epoxy composite including unidirectional or woven graphite fibers in an epoxy resin matrix. In one embodiment, the panel 12 may comprise an aircraft skin having a typical thickness of from about 0.05 to about 0.2 inch or more. As a particular example, the aircraft skin may have a thickness of from 0.10 to 0.13 inch. The stiffening member 14 may be made of materials such as metals or composites, e.g., unidirectional or woven graphite fibers in an epoxy resin matrix, and may be dimensioned as desired for a particular application. For example, the stiffening member 14 may have a thickness of from about 0.05 to about 0.2 inch or more, a width of from about 1 to about 6 inches, a height of from about 0.05 to about 2 inches, and a length of from about 1 to about 8 feet or more. As a particular example, when used as an aircraft skin stiffener, the member 14 may have a typical thickness of from 0.11 to 0.126 inch, a width of from 2 to 4 inches, a height of from 0.7 to 1 inch, and a length of from 18 to 36 inches. The stiffening member 14 shown in FIG. 1 has a hat-shaped cross section. However, other stiffening member shapes may be used in accordance with the present invention, such as L-shapes, I-shapes, J-shapes, T-shapes, Z-shapes and the like.

As shown in FIG. 1, the stiffened structure 10 includes adhesive fillets 16 at the interior corners where the stiffening member 14 meets the surface of the panel 12. In accordance with the present invention, the adhesive fillets 16 are made by a process of stacking, cutting and forming a selected number of multiple layers of adhesive material, as more fully described below.

Figure 2:
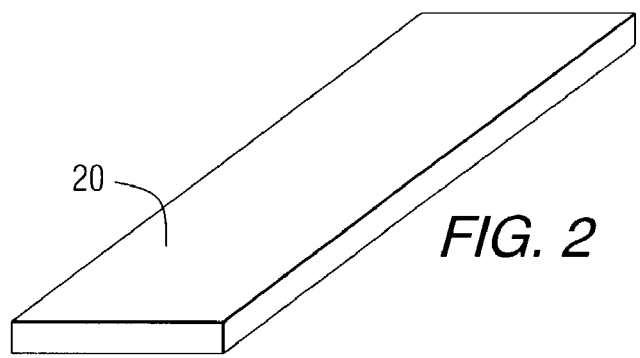
FIG. 2 is an isometric view of an adhesive sheet conventionally used to make adhesive fillets.
Figure 3:
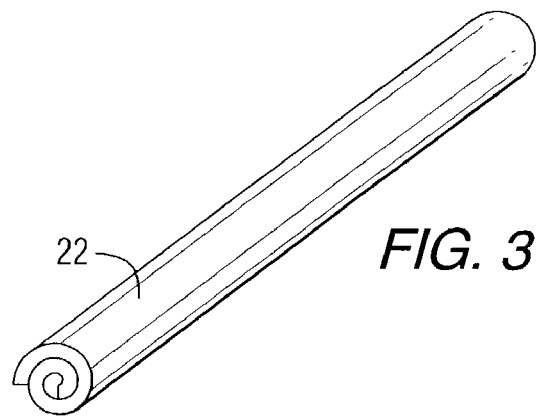
FIG. 3 is an isometric view of a rolled fillet rod made from an adhesive sheet as shown in FIG. 2.

FIGS. 2 and 3 illustrate a conventional method for making adhesive fillets. The process starts with an adhesive sheet or strip 20 as shown in FIG. 2. The adhesive strip 20 typically has an approximate thickness of about 0.014 inch, a width of about 1 inch, and a length of about 36 inches. As shown in FIG. 3, the adhesive strip 20 is hand rolled into a rod 22. In accordance with conventional processes, the hand-rolled rod 22 may be placed in a V-shaped mandrel under vacuum and may be subjected to heat and manual pressure in order to at least partially consolidate the adhesive rod 22.

Figure 4:
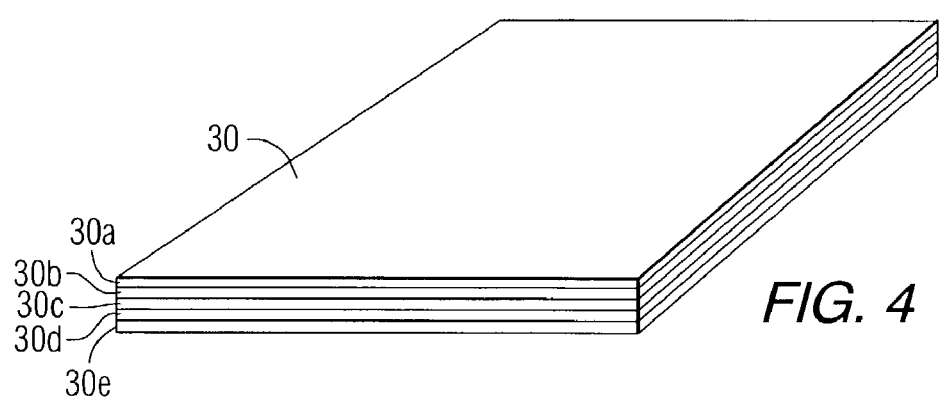
FIG. 4 is an isometric view of a layup of multiple adhesive sheets utilized in accordance with an embodiment of the present invention.

FIG. 4 illustrates a multi-layer adhesive structure 30 of the present invention including multiple adhesive layers 30a-30e. Five adhesive layers 30a-30e are shown in the embodiment of FIG. 4. However, other numbers of layers may be used depending on the particular application. For example, from 5 to 8 layers may be desirable. Each of the layers 30a-30e of the multi-layer adhesive structure 30 may be made of a material such as epoxy adhesive sold under the designation FM300 by Cytec, or the like. Materials such as scrim cloth, short chopped fibers, unidirectional graphite fibers and fillers may optionally be embedded in each layer 30a-30e, or positioned between each layer. The thickness of each layer 30a-30e preferably ranges from about 0.01 to about 0.02 inch. A particularly preferred thickness is about 0.014 inch The total thickness of the multi-layer adhesive structure 30 typically ranges from about 0.05 to about 0.2 inch or more, more preferably from about 0.07 to about 0.112 inch. Any suitable width of the multi-layer adhesive structure 30 may be used, for example, from about 1 to about 3 feet. Similarly, any suitable length of the multi-layer adhesive structure 30 may be used, for example, from about 1 to about 8 feet, or as a continuous roll.

Figure 5:
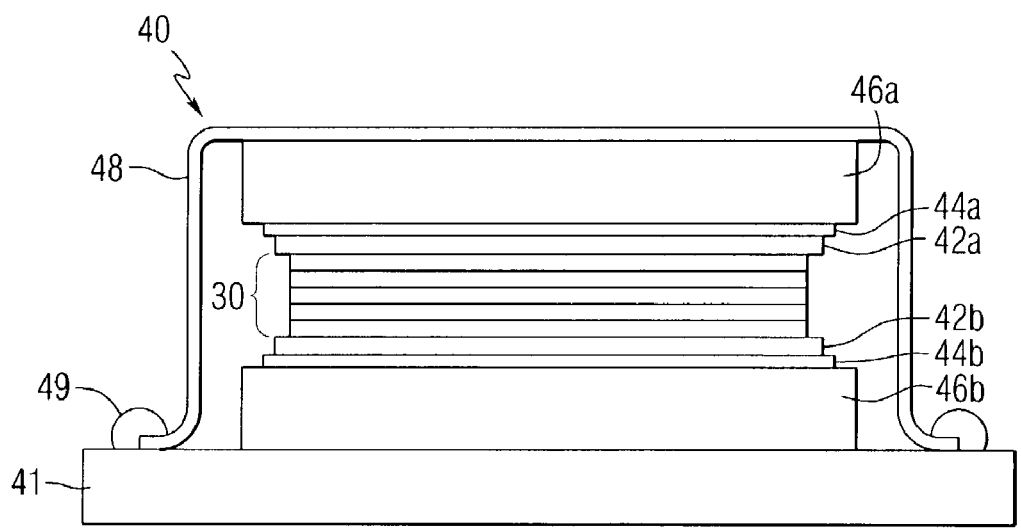
FIG. 5 is a partially schematic side view of an assembly for consolidating the multi-layer adhesive layup shown in FIG. 4.

The multi-layer adhesive structure 30 as shown in FIG. 4 may be consolidated in an assembly 40 including a vacuum table 41, as shown in FIG. 5. The multi-layer adhesive structure 30 is sandwiched between gas permeable layers 42a and 42b. The gas permeable layers 42a and 42b may comprise sheets of materials such as porous fluorinated ethylene propylene (FEP). Non-porous sheets 44a and 44b are positioned against the permeable sheets 42a and 42b. The non-permeable sheets 44a and 44b may be made of any suitable material such as metal, rigid plastic, flexible plastic or the like. Metal plates 46a and 46b are positioned outside the non-permeable sheets 44a and 44b. A vacuum bag 48 made of any suitable material such as nylon or silicone rubber is positioned over the various layers and sealed 49 to the vacuum table 41. Vacuum applied by the vacuum table 41 creates a vacuum inside the sealed bag 48. The adhesive layers 30a-30e may be further consolidated by heating, e.g., for 0.5 to 2 hours at a temperature of about 140° F. Without such consolidation at elevated temperature, the adhesive layers 30a-30e may delaminate during the subsequent forming process.

Figure 6:
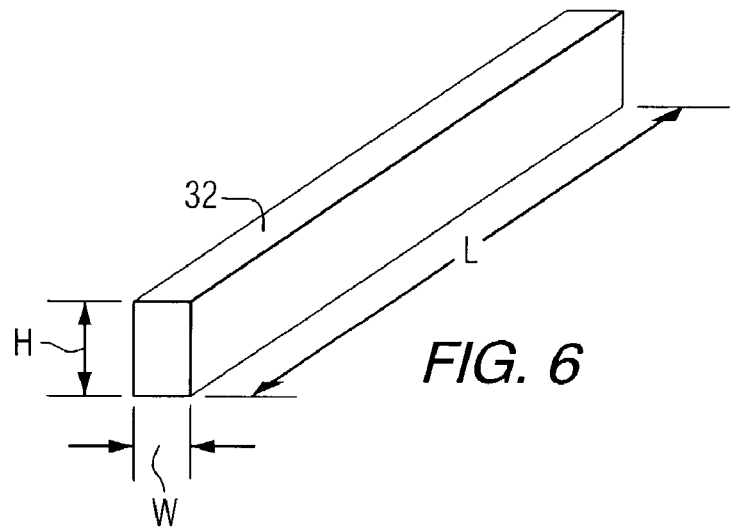
FIG. 6 is an isometric view of an adhesive bar cut from a consolidated multi-layer adhesive layup in accordance with an embodiment of the present invention.

After the multi-layer adhesive structure 30 has been consolidated, it may be cut into strips. FIG. 6 illustrates an adhesive strip 32 having a height H corresponding to the height of the consolidated multi-layer adhesive structure 30 shown in FIG. 5. The adhesive strip 32 has a width W and a length L. The height H typically is from about 0.05 to about 0.2 inch, the width W is typically from about 0.1 to about 0.5 inch, and the length L is typically from about 1 to about 8 feet or more. For example, H may range from 0.07 to 0.112 inch, W may range from 0.17 to 0.25 inch, and L may range from 30 to 36 inches. The strip 32 may be formed by any suitable cutting operation. For example, a conventional Gerber cutter may be used to automatically cut the consolidated multi-layer adhesive structure 30 into the strips 32. The cutter may utilize a blade oriented at a selected angle, for example, an angle of from about 45 to about 60 degrees measured from the plane of the multi-layer adhesive structure 30, preferably at an angle of from about 50 to about 55 degrees. The blade thickness should be sufficient to minimize the possibility of blade fracture during the adhesive cutting process. A blade thickness of 0.04 inch has been found to be suitable.

Figure 7:
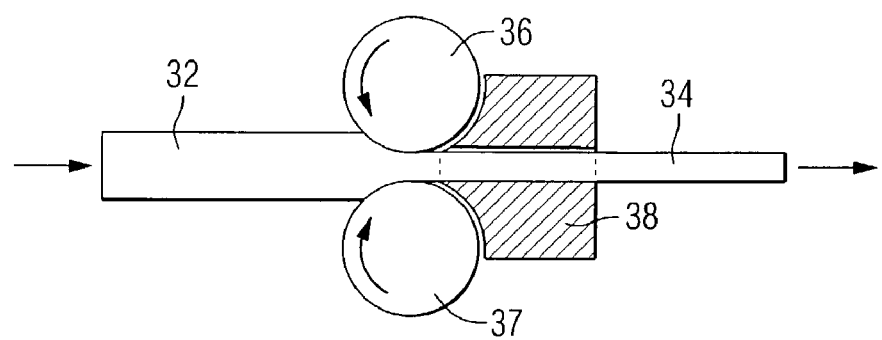
FIG. 7 is a partially schematic side view of an adhesive fillet forming apparatus in accordance with an embodiment of the present invention.

As shown in FIG. 7, the adhesive strip 32 may be formed into the shape of a fillet 34 by feeding the strip 32 through opposing rollers 36 and 37. Although the rollers 36 and 37 shown in FIG. 7 are opposed to each other, the rollers may alternatively be offset from each other. One or both of the rollers 36 and 37 may be driven by a conventional motor (not shown). In accordance with an embodiment of the present invention, a catcher 38 may be positioned adjacent to at least one of the rollers 36 and 37 in order to facilitate ejection of the adhesive fillet 34 from the rollers 36 and 37. For example, the catcher 38 may be used to prevent the adhesive fillet 34 from sticking to the roller 37 after it has been formed.

Figure 8:
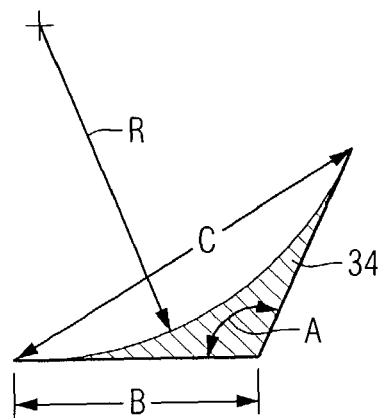
FIG. 8 is a cross-sectional view of an adhesive fillet produced in accordance with an embodiment of the present invention.

FIG. 8 illustrates a cross section of the adhesive fillet 34. The adhesive fillet 34 has a base angle A which may range from about 90 to about 120°, preferably from about 100 to about 110°. For example, an angle A of about 107° may be suitable. An arm of the adhesive fillet 34 may have a dimension B of from about 0.1 to about 0.5 inch, preferably from about 0.2 to about 0.3 inch. For example, the dimension B may be from about 0.22 to about 0.25 inch. The adhesive fillet 34 also has a typical chord distance C of from about 0.2 to about 0.8 inch, preferably from about 0.35 to about 0.5 inch. For example, the chord distance C may be about 0.36 inch. The adhesive fillet 34 may also be concave, with a curved surface having a radius R of from about 0.1 to about 2 inch or more, preferably from about 0.2 to about 0.5 inch. For example, the radius R may be about 0.3 inch.

Figure 9:
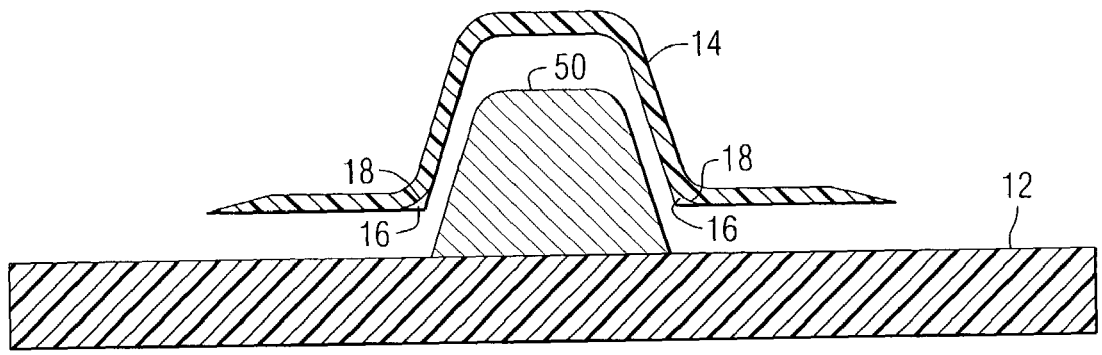
FIG. 9 is a sectional end view illustrating the assembly of a hat-shaped stiffening member on a skin panel, including the use of adhesive fillets of the present invention.

FIG. 9 is a sectional end view illustrating the assembly of a hat-shaped stiffening member 14 on a skin panel 12, including the use of adhesive fillets 16 of the present invention. The adhesive fillets 16 are attached at interior corners 18 of the stiffening member 14. A mandrel 50 is positioned on the skin panel 12, and the stiffening member 14 and adhesive fillets 16 are pressed against the mandrel 50 and skin panel 12. The stiffening member 14 and adhesive fillets 16, mandrel 50 and skin panel 12 are then placed under a vacuum to ensure intimate contact of the assembly. The assembly is then cured in an autoclave or oven. After the stiffening member 14 and adhesive fillets 16 are secured to the skin panel 12, the mandrel 50 is removed by sliding it out from the stiffening member 14.

Figure 10:
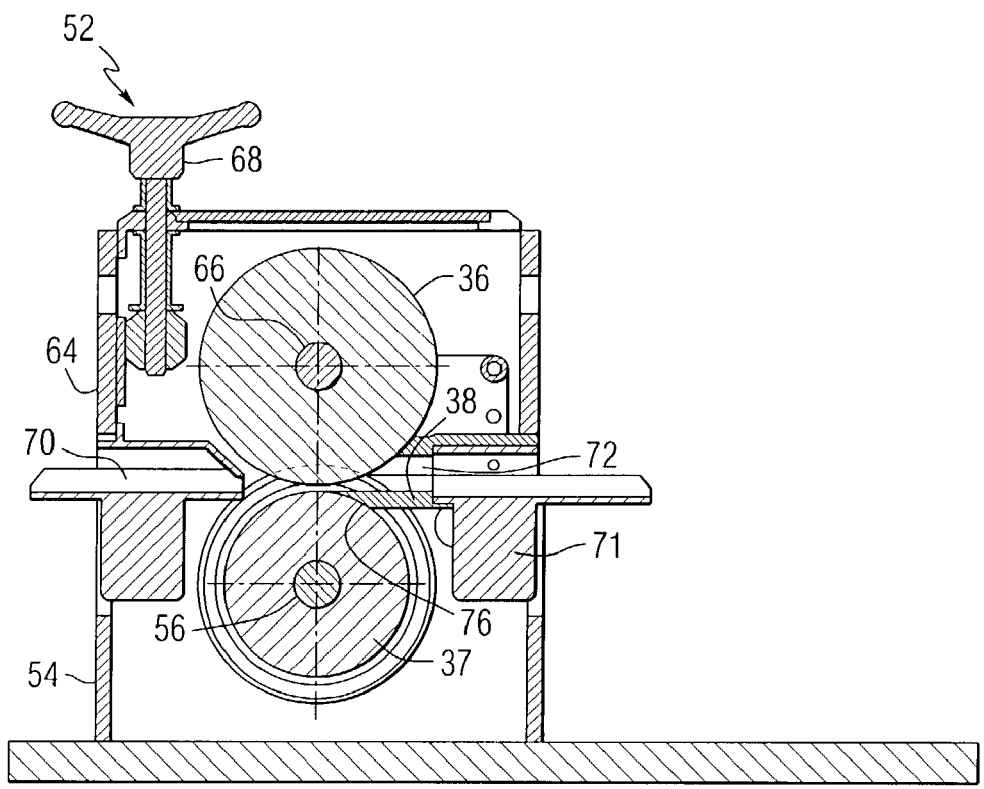
FIG. 10 is a side sectional view of an opposing roller adhesive fillet forming apparatus in accordance with an embodiment of the present invention.
Figure 11:
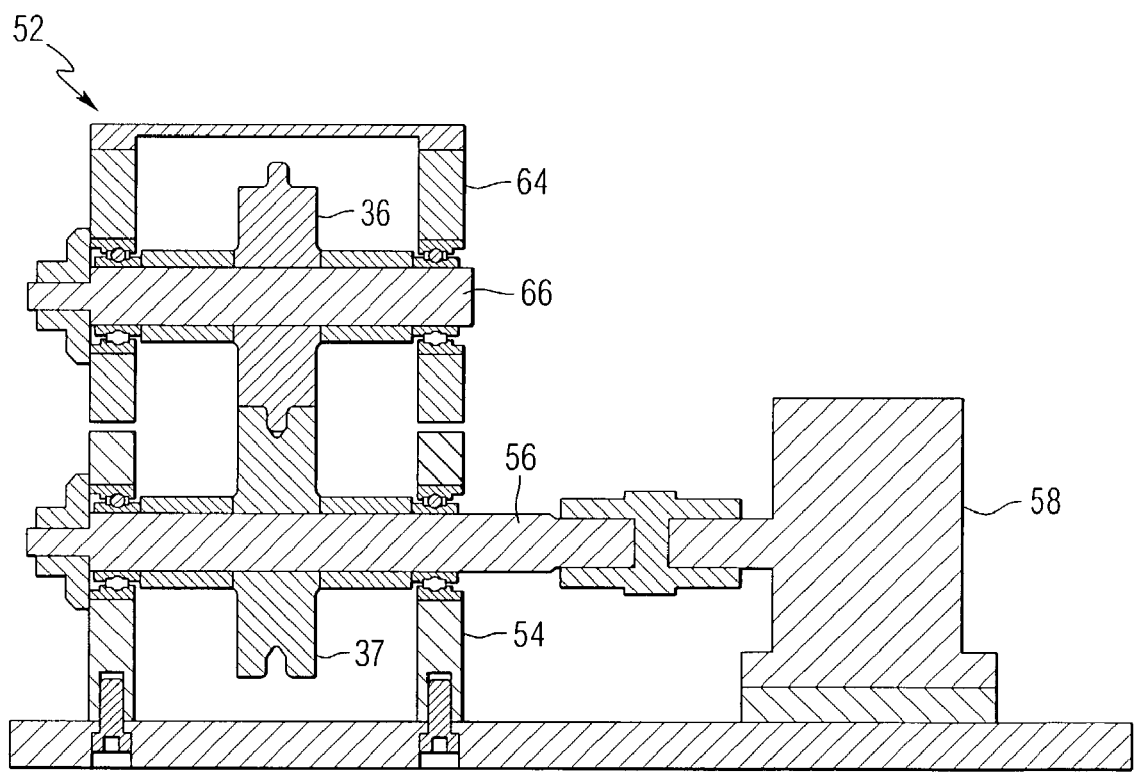
FIG. 11 is an end sectional view of the opposing roller adhesive fillet forming apparatus of FIG. 10.

FIGS. 10 and 11 illustrate an opposing roller adhesive fillet forming apparatus 52 in accordance with an embodiment of the present invention. The apparatus 52 includes a lower frame 54, which rotatably supports a drive shaft 56. A motor 58 is connected to the drive shaft 56. The lower roller 37 is mounted on the drive shaft 56. The motor 58 rotates the drive shaft 56 and the lower roller 37 at a desired speed, such as 33 rpm. An upper frame 64 supports a rotatable shaft 66 upon which the upper roller 36 is mounted. A rotatable handle 68 permits vertical movement of the upper roller 36 in relation to the lower roller 37. In the embodiment shown in FIGS. 10 and 11, the lower roller 37 has a recessed roller surface in the form of a generally V-shaped groove, while the upper roller 36 has an extended roller surface that fits into the recess of the lower roller 37.

As shown most clearly in FIG. 10, a feed channel 70 extends from the lower and upper frames 54 and 64 inwardly toward the rollers 37 and 36. The catcher 38 is mounted adjacent the rollers 37 and 36 on a support member 71, and includes an exit channel 72 through which the adhesive fillet travels after it has been formed by the rollers 37 and 36.

Figure 12:
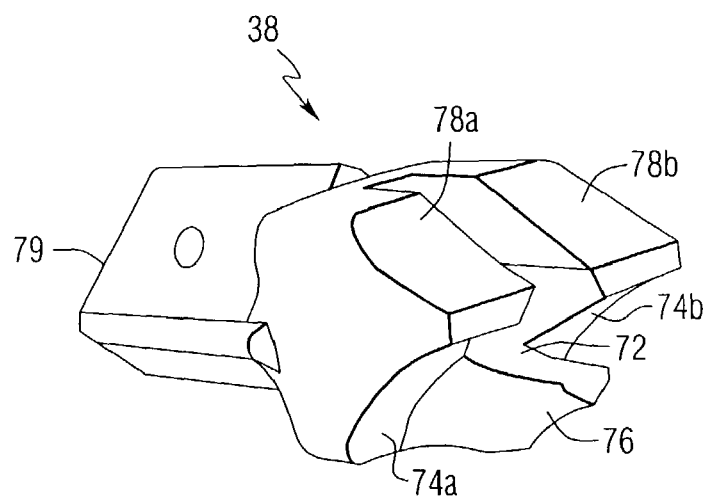
FIG. 12 is an isometric view of a fillet catcher in accordance with an embodiment of the present invention.

FIG. 12 is an isometric view of a fillet catcher 38 in accordance with an embodiment of the present invention. The exit channel 72 extends through the fillet catcher 38. The fillet catcher 38 includes contoured surfaces 74a, 74b and 76, which substantially conform with the surface of the lower roller 37. The fillet catcher 38 also includes contoured surfaces 78a and 78b, which substantially conform with the surface of the upper roller 36. As an adhesive fillet is formed by the rollers 37 and 36, it is removed from the rollers by the fillet catcher 38. The formed adhesive fillet contacts the contoured surface 76 of the fillet catcher 38, which extends into the cavity of the lower roller 37. The formed adhesive fillet then travels through the exit channel 72 of the fillet catcher 38, and exits from the back end 79 of the fillet catcher 38.

The following example is intended to illustrate various aspects of the present invention, and is not intended to limit the scope of the invention.

EXAMPLE

Five layers of adhesive sheets were stacked as shown in FIG. 4. Each sheet had a thickness of 0.014 inch, and was made of FM300 supported with scrim cloth. The width of the sheets was 0.23 inch, and the length of the sheets was 34 inches. The stacked adhesive sheets were consolidated in an assembly similar to that shown in FIG. 5. The sheets were sandwiched between gas permeable layers made of fluorinated ethylene propylene Teflon film (FEP) sold under the designation Pin Hole A5000. The gas permeable layers were sandwiched between non-permeable sheets made of nonporous Armalon material. Metal plates having thicknesses of 0.125 inch were positioned as shown in FIG. 5, and the assembly was covered with a sheet of porous polyester sold under the designation Air Weave and a nylon vacuum bag. The bag was sealed to a vacuum table by a seal made of nylon bagging material sold under the designation Airtech. The assembly was heated to a temperature of 140° F. under a vacuum of 26 inches of mercury and held for 1 hour. The pressure applied by the plates was about 12 psi. At temperatures above about 140° F., the adhesive layers may not sufficiently consolidate, while at temperatures above 140° F. the adhesive may begin to cure, making subsequent forming difficult. The consolidated adhesive layers were then cooled to room temperature and stored under vacuum.

Upon removal from the assembly, the consolidated multilayer adhesive structure had a thickness of about 0.075 inch. It was then cut in a Gerber cutter with a cutting blade angle of 55° to form multi-layer adhesive strips having heights of 0.075 inch, widths of 0.23 inch and lengths of 38 inches.

Each strip was then formed into an adhesive fillet shape by passing the strips through a roll-former as illustrated in FIGS. 10 and 11. The roll-former was equipped with a catcher as illustrated in FIG. 12, which prevented the formed adhesive fillet from sticking to the lower roller.

The formed adhesive fillet had a cross section similar to that shown in FIG. 8, having an angle A of 107.14°, an arm dimension B of 0.226 inch, a chord length C of 0.363 inch, and a radius R of 0.306 inch. During the roll-forming operation, the cross sectional area of the adhesive fillet was reduced approximately 60 percent in comparison with the initial cross sectional area of the multi-layer adhesive strip, resulting in compaction, deformation and elongation of the original strip by about 20 percent. If the cross sectional area of the adhesive fillet is reduced by 200 percent or more, it has been found that the adhesive fillet elongates over 30 percent and forms an irregular shaped fillet. After formation, the adhesive fillet may be sandwiched between a mandrel hat and skip panel, e.g., as shown in FIG. 9.

Whereas particular embodiments of this invention have been described above for purposes of illustration, it will be evident to those skilled in the art that numerous variations of the details of the present invention may be made without departing from the invention as defined in the appended claims.

What is claimed is:

1. A formed adhesive fillet comprising multiple stacked and consolidated adhesive layers, wherein the consolidated adhesive layers consist essentially of epoxy adhesive and do not include fibers.

2. The formed adhesive fillet of claim 1, wherein the fillet comprises from 5 to 8 of the stacked adhesive layers.

3. The formed adhesive fillet of claim 1, wherein the fillet has a cross section including two arms oriented at an angle of from about 90 to about 120 degrees with respect to each other.

4. The formed adhesive fillet of claim 2, wherein each of the arms has a length of from about 0.1 to about 0.5 inch.

5. The formed adhesive fillet of claim 1, wherein the fillet comprises a concave portion having a radius of curvature of from about 0.1 to about 2 inches.

6. The formed adhesive fillet of claim 5, wherein the fillet comprises two arms and has a chord length measured between tips of the arms of from about 0.2 to about 0.8 inch.

7. A stiffened panel comprising:
a panel;
a stiffening member attached to the panel; and
at least one formed adhesive fillet attached to the panel and the stiffening member, wherein the at least one formed adhesive fillet comprises multiple stacked and consolidated adhesive layers, wherein the consolidated adhesive layers consist essentially of epoxy adhesive and do not include fibers.

8. The stiffened panel of claim 7, wherein the fillet comprises a 5 to 8 of the stacked adhesive layers.

9. The stiffened panel of claim 7, wherein the panel comprises an aircraft panel having a thickness of from about 0.1 to about 0.2 inch.

10. The stiffened panel of claim 9, wherein the panel comprises a graphite/epoxy composite.

11. The stiffened panel of claim 7, wherein the stiffening member comprises a substantially hat-shaped cross-section.

12. The stiffened panel of claim 11, wherein the stiffening member has a thickness of from about 0.1 to about 0.2 inch, a width of from about 2 to about 5 inches, and a height of from about 0.5 to about 1.5 inches.

13. The stiffened panel of claim 11, wherein the adhesive fillets are attached at interior corners where the stiffener meets the panel.

* * * * *